3,015,538
METHOD OF MAKING FERRITES

Joachim F. L. Weber and Carl L. Heck, Nurnberg, Germany, assignors to International Standard Electric Corporation, New York, N.Y., a corporation of Delaware
No Drawing. Filed Aug. 12, 1955, Ser. No. 528,136
3 Claims. (Cl. 23—50)

The invention relates to a method of making manganese-zinc ferrites.

Ferrites are compounds of metal oxides with iron oxides and, as is well known, are used to an increasing extent for manufacturing magnets, magnet cores and other magnetically effective components. A difference is generally made between the so-called single ferrites, which are obtained by annealing a mixture of iron oxide with a metal oxide, and the compound ferrites which are made from a mixture of different metal oxides with iron oxide. As a rule, such ferrites are obtained in such a way that the raw oxides are mixed in a certain ratio and in a finely powdered condition with each other, and that this mixture is thereafter subjected to a more or less long annealing process at temperatures up to more than 1000°. Thereby the metal oxides react with the iron oxide thus forming the corresponding ferrites. The annealing of the raw oxides has been effected in streams of different gases conducted over the reacting oxide mixture. Thus it is known, for instance, to use a weak oxidizing gas or a weak reducing gas. Further, there has been suggested the use of dry inert gases and or super heated steam. By the selective use of any one of these methods there is obtained ferrites with different magnetic properties.

The inventive method differs from the conventional ones in that the annealing process, during which the reaction of the oxides is effected, is performed in an atmosphere containing sulphur dioxide. Surprisingly, by using sulphur dioxide during annealing there is achieved a substantial improvement in the magnetic properties of the ferrites, especially a substantial increase in permeability. This was the more surprising since the presence of sulphide compounds was hitherto regarded as being detrimental.

For the manufacture of manganese zinc ferrites the very pure raw materials, i.e. 45 to 60 moles of iron oxide ($Fe_2O_3$), 5 to 17 moles of manganese oxide ($Mn_3O_4$) and 5 to 30 moles of zinc oxide (ZnO) are intimately mixed with one another. In a preferred example, 60 moles of $Fe_2O_3$, 14 moles of $Mn_3O_4$ and 28 moles of ZnO, that is a ratio of weights of 68.08% $Fe_2O_3$, 15.65% $Mn_3O_4$ and 16.27% ZnO are used. Distilled water is added to the mixture and the whole is very finely ground or pulverized. Thereafter the ground material is washed and dried for a period of seven hours at a temperature of 110° C. Subsequently thereto the powder is pressed by the application of a pressure of about 2.5 tons per cm.$^2$ to the shape of a core, for instance, a ring-core. For the purpose of completely removing any moisture the pressed core is finally dried for another period of 12 hours at a temperature of 220° C.

After having been cooled to room temperature the pressed core is inserted into an annealing furnace (which has not been preheated), and through the furnace there is led a weak stream at a rate of approximately 6 liters per hour of a mixture of dried nitrogen (gas) containing 1 to 2% of oxygen and of dried sulphur dioxide (about 0.6 liter per hour). In this furnace the pressed object is annealed for about four-and-a-half hours at a temperature between 1200 and 1450° C., preferably at 1350° C. and is thereafter, in the course of about twelve hours, cooled down to a temperature of 200° C. During the annealing and cooling process the stream of gas remains constant. After the cooling of the core to 200° it is taken out of the furnace and tested.

With the aid of the folowing schedule the values of a core manufactured according to the invention method are compared with those of a second core manufactured in accordance with the same method, but without the employment of sulphur dioxide:

|  | Annealing with $SO_2$ | Annealing without $SO_2$ |
|---|---|---|
| $\mu$ | 2,480 | 1,480 |
| $tg\delta$ | $39.10^{-3}$ | $43.10^{-3}$ |
| $tg\delta/\mu$ | $15.10^{-6}$ | $29.10^{-6}$ |

As may be seen from the above schedule the permeability of the core manufactured according to the inventive method is substantially higher, i.e. amounts to about double the value. Apart therefrom the loss angle is a smaller one. Consequently there also results a substantially better value for the ratio $tg\delta/\mu$, i.e. tangent of loss angle permeability.

Hence by adding the sulphur dioxide there will be achieved a considerable technical progress. The thus obtained cores can be successfully employed as transformer cores, for loading coils and other ranges of practical application.

While we have described above the principles of our invention in connection with specific apparatus, it is to be clearly understood that this description is made only by way of example and not as a limitation of the scope of our invention as set forth in the objects thereof and in the accompanying claims.

What is claimed is:

1. A method of making a ferrite, comprising mixing 45–60 mol percent iron oxide, 5–17 mol percent manganese oxide and 5–30 mol percent zinc oxide, and annealing said mixture in an atmosphere containing approximately 10% sulphur dioxide.

2. The method according to claim 1, wherein said atmosphere also contains a small percentage of oxygen and the balance of dried nitrogen.

3. A method of making a ferrite comprising mixing 45–60 mol percent iron oxide, 5–17 mol percent manganese oxide and 5–30 mol percent zinc oxide, washing and drying the mixture, pressing the mixture to a desired shape, and annealing said mixture in an atmosphere containing approximately 10% sulphur dioxide at a temperature between 1200 and 1450° C.

References Cited in the file of this patent

UNITED STATES PATENTS

| 1,976,230 | Kato et al. | Oct. 9, 1934 |
| 2,238,437 | Zischkau | Apr. 15, 1941 |
| 2,526,707 | Stahl et al. | Oct. 24, 1950 |
| 2,764,552 | Buckley et al. | Sept. 25, 1956 |